United States Patent [19]

Liebermann

[11] Patent Number: 4,929,214
[45] Date of Patent: May 29, 1990

[54] INFLATABLE ENCLOSURE AND MEANS TO INFLATE SAME

[76] Inventor: Ron B. Liebermann, 2805 Lime Kiln La., Louisville, Ky. 40222

[21] Appl. No.: 115,372
[22] Filed: Nov. 2, 1987
[51] Int. Cl.$^5$ .............. A63H 27/10; B63B 22/22; B63C 9/12
[52] U.S. Cl. .................. 446/221; 441/98; 441/31
[58] Field of Search ............ 446/220, 221, 222; 441/30, 31, 98, 99, 101

[56] References Cited

U.S. PATENT DOCUMENTS

| 826,342 | 7/1906 | Magnin | 441/101 |
|---|---|---|---|
| 1,112,186 | 9/1914 | Anderson | 441/98 |
| 1,208,232 | 12/1916 | Taylor | 441/98 |
| 1,247,809 | 11/1917 | Foster | 446/220 |
| 1,458,822 | 5/1923 | Halter | 441/99 |
| 3,104,403 | 9/1963 | Lortz | 441/99 |
| 3,382,514 | 5/1968 | Boscov | 441/30 |
| 3,710,409 | 1/1973 | Davidson | 441/80 |
| 3,786,590 | 1/1974 | Weeks | 441/31 |
| 3,902,425 | 9/1975 | Kurtzemann | 441/98 |
| 4,393,867 | 7/1983 | Baron | 128/87 R |

Primary Examiner—Robert A. Hafer
Assistant Examiner—Michael Brown
Attorney, Agent, or Firm—Scott R. Cox

[57] ABSTRACT

The invention provides novel inflatable enclosure means including an inflatable outer envelope surrounding novel means for generating a gas to inflate the outer envelope. The novel gas generating means includes a fracturable first envelope, which contains a first reactive component of a multi-component gas generating chemical system, and a second envelope in fluid-communication with the first envelope upon fracture of the first envelope and containing a second reactive component of the gas generating chemical system. The first envelope is fractured to release the reactive component contained therein, so that it mixes with the other reactive component contained in the second envelope, thereby generating an inflating gas.

6 Claims, 1 Drawing Sheet

INFLATABLE ENCLOSURE AND MEANS TO INFLATE SAME

BACKGROUND OF THE INVENTION

The present invention relates to self-inflating enclosures, such as balloons and the like, and, more particularly, to such an inflatable enclosure having inflating means.

Various self-inflating enclosures, such as balloons are known.

One such known inflatable enclosure is illustrated in U.S. Pat. No. 1,247,809, issued on Nov. 27, 1917 to F. C. Foster, which shows an inflatable balloon structure having an inflation neck connected to a gas generator. This old gas generator includes a first cylindrical tube, open at both of its ends, and containing a material, such as carbide, which forms a gas when contacted with water. A second open-ended tube is imbedded within the carbide and contains water. The open ends of the second tube are sealed with wax plugs. Water entering the outer tube, through the open ends thereof, initiates the formation of gas and generates sufficient heat to melt the wax plugs, closing the ends of the second tube, which permits the water inside the second tube to exit from the inner tube into the outer tube to complete the gas generation by reacting with the carbide in the outer tube. The gas passes through the inflation neck and into the balloon to, thus, inflate the same.

U.S. Pat. No. 1,771,730, issued on July 29, 1930 to R. Marcks, shows an inflatable flotation bag, fabricated of a water permeable, elastic flexible material, such as linen and containing a small charge of gas producing chemicals, such as powdered citric acid, tartaric acid, or an acetate and sodium bicarbonate. When the water permeable bag is immersed in water, the water enters the bag causing a chemical reaction with the gas producing chemicals therein, which, in turn, inflates the bag. The water also causes the permeable bag material to swell, closing the permeable bag material, to form an impervious bag.

U.S. Pat. No. 3,310,024, issued on Mar. 21, 1967 to R. C. McConnell, illustrates a signal balloon having an inflation neck connected to a compressed gas cylinder. This old signal balloon has a check valve and a pointed needle for piercing the gas cylinder. When the gas cylinder is attached to the inflation neck, the needle pierces the gas cylinder, thus releasing pressurized gas into the balloon. The check valve prevents the back flow of gas from the balloon.

U.S Pat. No. 3,786,590, issued on Jan. 22, 1974 to C. G. Weeks, shows a flotation device to be attached to, for example, a fishing rod, to prevent it from sinking, if dropped into the water. The flotation device includes a plastic cylinder containing a gas producing chemical, such as calcium carbide. One end wall of the cylinder has an opening for water to enter the cylinder. The other end wall of the cylinder has an opening for the egress of gas. A balloon has a filling neck attached to the cylinder at the gas egress end. A check valve is located at the gas egress opening of the cylinder to prevent gas from flowing out of the balloon. The cylinder is attached to the fishing rod by clamps. If the fishing rod is dropped into the water, the water will enter the cylinder, creating a gas upon reaction with the calcium carbide inside the cylinder, that inflates the balloon and, thus, prevents the fishing rod from sinking.

The aforenoted prior-art devices are complicated in structure and, hence, expensive to manufacture.

SUMMARY OF THE INVENTION

The present invention provides a novel device. Basically, the novel device of the present invention comprises a fracturable first envelope; a first gas reactive component of a multi-component gas-generating chemical system contained within said first envelope; and a second envelope in fluid-communication with the first envelope upon fracture of said first envelope and containing a second reactive component of the gas generating chemical system.

The present invention also provides an inflatable enclosure comprising: a fracturable first envelope; a first reactive component of a multi-component gas generating chemical system contained within said first envelope; a second envelope in fluid-communication with the first envelope upon fracture of said first envelope and containing a second reactive component of the gas-generating chemical system; and a fluid-impermeable third envelope surrounding said second envelope.

BRIEF DESCRIPTION OF THE DRAWINGS

A better understanding of the present invention will be had upon reference to the following description in conjunction with the accompanying drawings in which like numerals refer to like parts throughout the several views and wherein.

DETAILED DESCRIPTION

Figure 1:
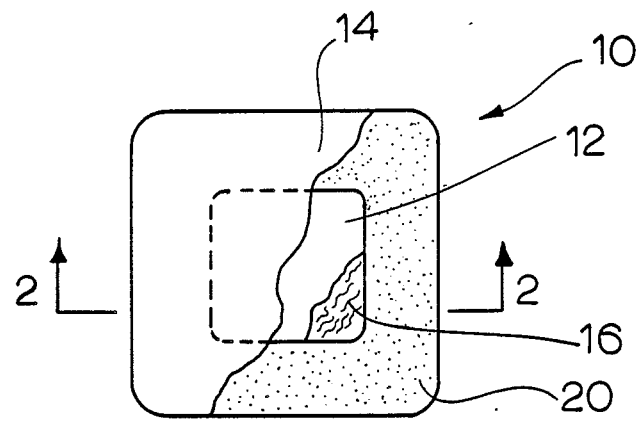
FIG. 1 is a top view of a presently preferred embodiment of a novel device provided in accordance with the present invention, partially in section to show internal details.
Figure 2:
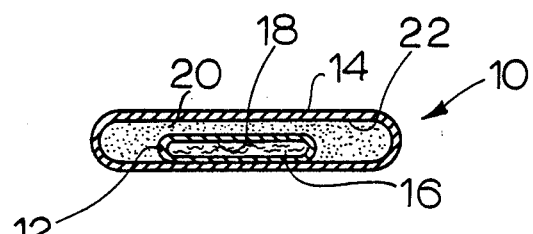
FIG. 2 is a cross-sectional side view of the inflating device of FIG. 1 as seen in the direction of arrows 2—2 in FIG. 1.
Figure 3:
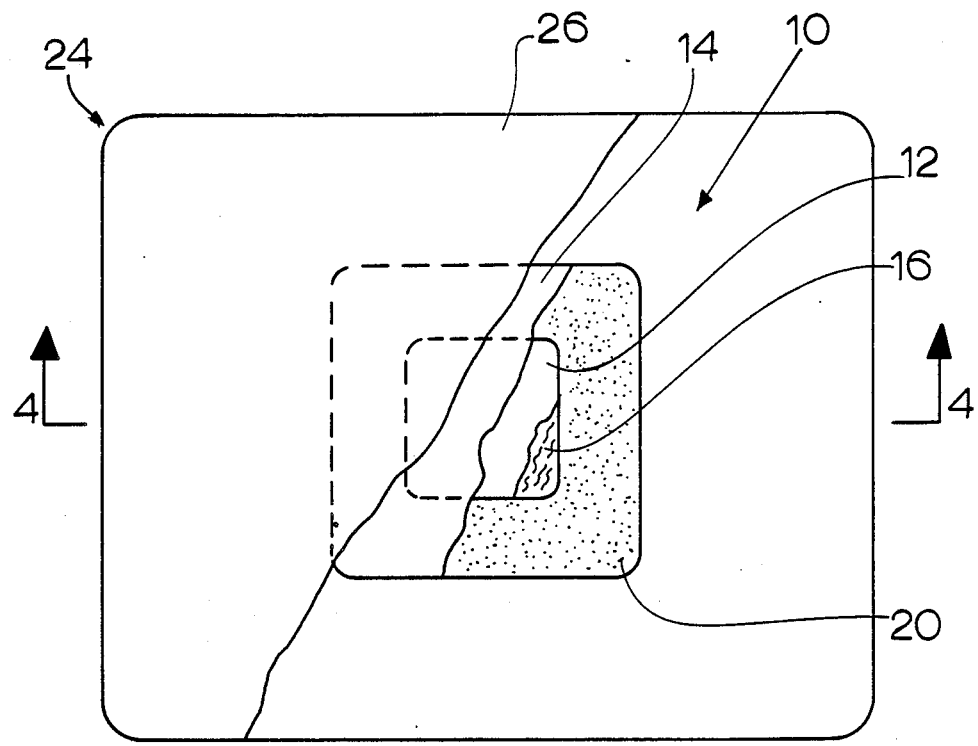
FIG. 3 is a plan view of an inflatable enclosure, partially fragmented to show internal details, including features of the present invention.
Figure 4:
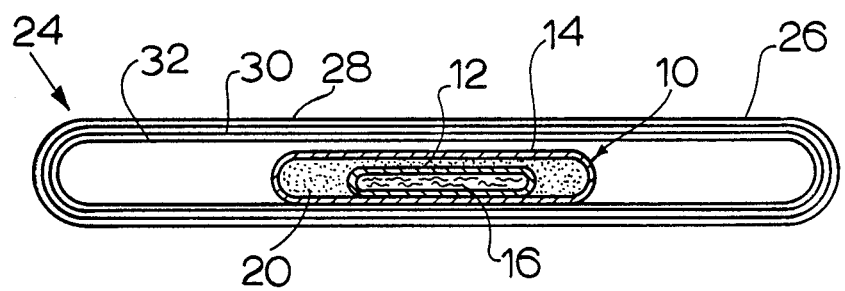
FIG. 4 is a cross-sectional side view of the inflatable enclosure of FIG. 3 as seen in the direction of arrows 4—4 in FIG. 3.

With reference to FIGS. 1 and 2, there is shown a presently preferred embodiment of a novel device, generally denoted as the numeral 10, that is provided in accordance with the present invention. The device 10 can, by itself, comprise a self-inflating enclosure, or, alternatively, can comprise an inflating device to be located within and surrounded by an inflatable outer envelope 26 (as shown in FIGS. 3 and 4) for generating a gas to inflate that outer envelope 26 of another form of inflatable enclosure 24 that is also provided in accordance with the present invention.

The novel device 10 comprises a fracturable first closed envelope 12 that is in fluid-communication with a second envelope 14 upon fracture of the first envelope 12. As illustrated, the first envelope 12 is smaller in physical size than the second envelope 14 and is enclosed by the second envelope 14. The first envelope 12 can be located at a fixed position within the second envelope 14 by, for example, adhesively connecting the first envelope 12 to the interior surface of the second envelope 14 at a convenient location, such as the geometric center of the second envelope 14.

The novel device 10 further includes a multi-component gas generating chemical system. The gas generating chemical system includes at least two components 16 and 20, with a first component 16 being in solution, and the second component 20 being in solid form, such as powder or tablet form. Each of the reactive components 16 and 20 is non-toxic and the generated gas is also non-toxic. The elements of the gas generating system can include, for example, three elements, i.e. a weak acid, a base, and water combined in different combinations. For example, a first reactive component 16 of the gas generating system can be water and a second reactive component 20 can be a combination of a weak acid and base, in solid form; or one reactive component can be a weak acid in solution and the other reactive component can be a base in solid form; or one reactive component can be a base in solution and the other component can be an acid in solid form. A suitable acid is citric acid, and a suitable base is sodium bicarbonate.

With continued reference to FIGS. 1 and 2, the fracturable first envelope 12 is fabricated of a fluid-impermeable material that is breakable, burstable, frangible, or otherwise fracturable, such as, for example, vacuum-metalized polyester laminated with polyethylene, or non-hydroscopic film having a burstable or peelable seal. One of the reactive components of the gas generating chemical system, generally denoted as the numeral 16, is contained within and enclosed by the first envelope 12. This reactive component 16 can be either the solution or the solid component. The interior surface of the first envelope 12 can be covered or coated with a moisture absorbent material 18, such as paper, to soak-up residual moisture from the solution, after the gas generating process has been completed.

As illustrated in the drawing Figures, the second envelope 14 encloses the first envelope 12 and, thus, is in fluid-communication with the first envelope 12 upon fracture of the first envelope 12. The second envelope 14 can be fabricated of a gas-permeable porous material, such as, for example, calendered, bonded, random-laid fiber; or a gas-impermeable material, such as, for example polyethylene, optionally provided with apertures through the walls of that second envelope 14. It is further contemplated that the second envelope 14 can be fabricated of a gas-impermeable, frangible material, which will burst, break open, or otherwise fracture under the influence of the pressure of the gas generated by the reaction of the reactive components of the gas generating system, thereby releasing the generated gas therefrom. One such suitable frangible material is polyethylene. A second of the reactive components of the gas generating chemical system, generally denoted as the numeral 20, is contained within and enclosed by the second envelope 14. This second reactive component 20 can be either the solution or the solid component. The interior surface of the second envelope 14 can be covered or coated with a moisture absorbent material 22, such as paper, to soak-up residual moisture from the solution, after the gas generating process has been completed.

Now, with reference to FIGS. 3 and 4, there is shown an inflatable enclosure, generally denoted as the numeral 24, such as a balloon or like, that can have a variety of end uses such as, for example, an inflatable toy or flotation device such as a life preserver or raft. As illustrated, the inflatable enclosure 24 includes the aforedescribed novel device 10 of the present invention, surrounded by and enclosed within a third or outer envelope 26, which is to be inflated by the non-toxic gas generated by the reaction of the components of the gas generating chemical system. The second envelope 14 of the inflating device 10 is smaller in size than and is enclosed within and surrounded by the third or outer envelope 26 and can be located at a fixed position within the third envelope 26 by, for example, adhesively connecting the second envelope 14 to the interior surface of the third envelope 26 at a convenient location therein. The third or outer envelope 26 is fabricated of a gas-impermeable material, which is also non-hydroscopic, so that it will not deteriorate when contacted with water. Various materials have been found suitable for the third envelope 26. Such materials include, for example, "Mylar" sold by Dupont which is a metalized polyester, vinyl film, PE-paper colaminates, PE-foil, PE-cellulose, and biaxially oriented nylon. Biaxially oriented nylon is preferred, because it does not have a "grain" and, therefore, has a high resistance to stretching in both directions. The biaxially oriented nylon of the third or outer envelope 26 includes a layer 28 of aluminum film bonded to the biaxially oriented nylon 30 on the exterior of the third envelope 26 and a layer 32 of polyethylene bonded to the biaxially oriented nylon 30 on the interior of the third envelope 26. The layer of aluminum film 28 provides a gas barrier and, also, a highly reflective surface, which highlights graphics printed thereon.

Prior to being inflated, the inflatable enclosure 24 can be folded to provide a small package capable of being easily stored or carried. When it is desired to inflate the inflatable enclosure 24, a user need only apply a sufficient force to the inflating device 10 to cause the first envelope 12 to burst or break, releasing the first reactive component 16 of the gas generating system contained therein, so that it contacts the second reactive component 20 contained in the second envelope 14. A user can accomplish this by applying a pressure with his hands or fingers to the exterior side of the third or outer envelope 26 and against the first envelope 12. The inflating gas thus generated is then discharged from the second envelope 14, through its pores or the optional apertures provided therein, or by fracturing the same, into the third or outer envelope 26 to inflate it.

It should be apparent that while there have been described herein what are presently considered to be presently preferred embodiments of the present invention in accordance with the Patent Statutes, changes may be made in the disclosed apparatus without departing from the true spirit and scope of this invention. It is, therefore, intended that the appended claims shall cover such modifications and applications that may not depart from the true spirit and scope of this present invention.

What is claimed is:

1. An inflatable enclosure comprising:
  (a) a fracturable first envelope;
  (b) a first reactive component of a multi-component gas generating chemical system contained within said first envelope;
  (c) a second non-inflatable, air permeable envelope in fluid-communication with said first envelope upon fracture of said first envelope wherein said first envelope is affixed inside the entire interior surface of the second envelope;
  (d) a second reactive component of said gas generating chemical system contained within said second envelope; and
  (e) a third envelope fabricated of a fluid-impermeable, gas-impermeable material surrounding said second envelope wherein said second envelope is affixed to the inside surface of the third envelope.

2. The inflatable enclosure of claim 1, wherein said third envelope is fabricated of a stretch-resistant material.

3. The inflatable enclosure of claim 1, wherein said third envelope is fabricated of a water-resistant material.

4. The device of claim 1 wherein:
(a) the first reactive component is non-toxic;
(b) the second reactive component is non-toxic; and
(c) the reactive gas product is non-toxic.

5. The device of claim 4 wherein:
(a) one of the first and second reactive components is an acid; and
(b) the other of the first and second components is a base.

6. The device of claim 5 wherein:
(a) the acid is citric acid; and
(b) the base is sodium bicarbonate.

* * * * *